United States Patent [19]
Kojima et al.

[11] Patent Number: 4,984,485
[45] Date of Patent: Jan. 15, 1991

[54] APPARATUS AND METHOD FOR CONTROLLING AUTOMATIC TRANSMISSION FOR MOTOR VEHICLE, WITH ANTI-SQUAT SHIFTING ARRANGEMENT

[75] Inventors: Masahiro Kojima, Toyota; Seiichi Nishikawa, Toyokawa; Nobuaki Takahashi, Toyota, all of Japan

[73] Assignee: Toyota Jidosha Kabushiki Kaisha, Toyota, Japan

[21] Appl. No.: 371,560

[22] Filed: Jun. 23, 1989

[30] Foreign Application Priority Data

Jul. 8, 1988 [JP] Japan .................................. 63-170211

[51] Int. Cl.$^5$ .............................................. B60K 41/06
[52] U.S. Cl. .................................... 74/866; 364/424.1
[58] Field of Search ..................... 74/866; 364/424.1

[56] References Cited

U.S. PATENT DOCUMENTS

| | | | |
|---|---|---|---|
| 3,738,199 | 6/1973 | Kubo et al. | 74/869 |
| 4,513,638 | 4/1985 | Nishikawa et al. | 74/866 |
| 4,644,826 | 2/1987 | Kubo et al. | 74/866 |
| 4,648,289 | 3/1987 | Kubo et al. | 74/866 |
| 4,685,356 | 8/1987 | Iwatsuki | 74/866 |
| 4,701,853 | 10/1987 | Osanai | 74/886 X |
| 4,730,708 | 3/1988 | Hamano et al. | 74/866 X |
| 4,784,020 | 11/1988 | Harano et al. | 74/866 |
| 4,803,899 | 2/1989 | Kumura | 74/866 |

FOREIGN PATENT DOCUMENTS

61-116160  6/1986  Japan.

*Primary Examiner*—Leslie A. Braun
*Assistant Examiner*—Benjamin Levi
*Attorney, Agent, or Firm*—Oblon, Spivak, McClelland, Maier & Neustadt

[57] ABSTRACT

A method and an apparatus for controlling a vehicle automatic transmission which has a plurality of selectively established gear positions and is shifted to and temporarily held in a predetermined one of the gear positions other than the lowest-gear position, upon operation of a shift lever from its neutral position to one of drive positions, if a predetermined condition is satisfied within a preset time period after the shift lever operation. The transmission is generally shifted down to the lowest-gear position after it is held in the predetermined one gear position. This anti-squat shifting of the transmission responsive to the shift lever operation from the neutral position, contributes to reduction in the shifting shock and prevention of squatting of the tail or stern of the vehicle when the shift lever is moved from the neutral position to a drive position such as DRIVE, SECOND or LOW, in which the transmission is selectively placed in the two or more gear positions (e.g., 1st-gear, 2nd-gear, and 3rd-gear positions).

11 Claims, 6 Drawing Sheets

FIG.3

| LEVER POSITION | SHIFT POSITION | S1 | S2 | C0 | C1 | C2 | B0 | B1 | B2 | B3 |
|---|---|---|---|---|---|---|---|---|---|---|
| P | Park | × | × | ○ |  |  |  |  |  |  |
| R | Rev | × | × | ○ |  | ○ |  |  |  | ○ |
| N | Neu | × | × | ○ |  |  |  |  |  |  |
| D | 1st | ○ | × | ○ | ○ |  |  |  |  |  |
| D | 2nd | ○ | ○ | ○ | ○ |  |  |  | ○ |  |
| D | 3rd | × | ○ | ○ | ○ | ○ |  |  | ○ |  |
| D | OD | × | × |  | ○ | ○ | ○ |  | ○ |  |
| S | 1st | ○ | × | ○ | ○ |  |  |  |  |  |
| S | 2nd | ○ | ○ | ○ | ○ |  |  | ○ | ○ |  |
| S | 3rd | × | ○ | ○ | ○ | ○ |  |  |  |  |
| L | 1st | ○ | × | ○ | ○ |  |  |  |  | ○ |
| L | 2nd | ○ | ○ | ○ | ○ |  |  | ○ | ○ |  |

[CONDITIONS SATISFIED AT EARLY TIME]

[CONDITIONS SATISFIED AT INTERMEDIATE TIME]

[CONDITIONS SATISFIED AT LAST TIME]

APPARATUS AND METHOD FOR CONTROLLING AUTOMATIC TRANSMISSION FOR MOTOR VEHICLE, WITH ANTI-SQUAT SHIFTING ARRANGEMENT

BACKGROUND OF THE INVENTION

1. Field of the Invention

The present invention relates to an apparatus and a method for controlling shifting operations of an automatic transmission for an automotive vehicle, and more particularly to improvements in such apparatus and method, for reducing shifting shocks of the transmission when the shift lever is moved from its neutral position to one of its forward and reverse drive positions.

2. Discussion of the Prior Art

U.S. Pat. No. 3,738,199 discloses an electronically controlled automatic transmission, in which an operation of the transmission shift lever from its neutral position to one of its forward drive positions causes the automatic transmission to be shifted to a transient position, which is one of the speed positions of the transmission other than the first-speed or lowest-gear position, in order to reduce the shifting shock. This manner of controlling the automatic transmission is referred to as "anti-squat shifting control", since the squatting of the vehicle upon shifting of the shift lever from the neutral position to a forward drive position can be prevented. More specifically, when the shift lever is moved from its neutral position, appropriate frictional coupling devices of the automatic transmission are commanded to be engaged to establish the transient position (other than the first-speed position). The transmission is held in the transient position for a predetermined suitable time (e.g., 0.8 second) after the operation of the shift lever from the neutral position. Then, the transmission is commanded to be shifted to the first-speed position.

For example, a transmission shift lever has three forward drive positions "D", "S" and "L", while a transmission has a total of four speed or gear positions, "1st-speed", "2nd-speed", "3rd-speed" and "OD" (overdrive position), as indicated in FIG. 3. If the shift lever is shifted from the neutral position "N" to the DRIVE position "D", by way of example, the transmission is shifted to the 1st-speed position by operating the clutches C0 and C1 to the engaged position, if the anti-squat shifting control is not effected. If the transmission is operated in the anti-squat shifting control mode, however, the transmission is first shifted to its 2nd-speed position, with the clutches C0 and C1 and brake B2 brought to the engaged position, for instance. Thereafter, the brake B2 is disengaged or released, to shift the transmission to the 1st-speed position.

According to the anti-squat shifting control as indicated above, the shifting shock of the transmission is reduced by an amount corresponding to a difference in the gear ratio between the 1st-speed and 2nd-speed positions. Further, the degree of the squatting phenomenon of the vehicle (i.e., lowering of the stern or tail of a vehicle) upon starting of the vehicle can be significantly reduced.

Laid-open Publication No. 61-116160 of unexamined Japanese patent application discloses a technique in which the anti-squat shifting control is effected only when the running speed of the vehicle is zero and when the speed of the engine exceeds a predetermined upper limit. This arrangement is derived from the recognition that the transmission undergoes a particularly large shifting shock when the shifting of the shift lever from its neutral position to the DRIVE position occurs at a relatively high speed of the engine, i.e., when the vehicle is started (i.e., shifted into a drive gear) with the engine speed at a relatively high level. In other words, the arrangement is based on the concept that the vehicle should be started fast when the shifting of the shift lever from the neutral position to the DRIVE position occurs while the engine speed is relatively low.

In the conventional anti-squat shifting control arrangements discussed above, the anti-squat shifting of the transmission is accomplished unconditionally in response to any shifting operation of the shift lever from the neutral position to one of the drive positions, or alternatively the determination as to whether the anti-squat shifting is effected is based on only the vehicle speed and the engine speed at the time of the shifting of the shift lever from the neutral position. In the latter case according to the laid-open Publication No. 61-116160, the anti-squat shifting is not effected if the vehicle and engine speeds upon operation of the shift lever from its neutral position are not satisfied. Namely, the transmission is not controlled in the anti-squat shifting mode, even if the above-indicated conditions are satisfied a short time after the operation of the shift lever from the neutral position.

Recently, there is a growing demand for "full-time" 4-wheel drive vehicles which are always driven by four drive wheels. These 4-wheel drive vehicles wherein the engine power is distributed to the four wheels experience a reduced power loss of the engine, as compared with the ordinary 2-wheel drive vehicles, even when the vehicles are started with the transmission placed in the low-gear position and the engine running at a high speed. In the 2-wheel drive vehicles, the wheel tires may slip on the road surface when the drive torque exceeds the total friction force between the two drive wheel tires and the road surface. In the 4-wheel drive vehicles, however, the four drive wheels are less likely to slip on the road surface because of the distribution of the drive torque to the four wheels, whereby the power transmission system including the automatic transmission should have increased strength sufficient to withstand the relatively large load, particularly at the time of abrupt starting of the vehicles at relatively high speeds of the engine. Therefore, the 4-wheel drive vehicles require accurate anti-squat shifting control of the automatic transmission. Accordingly, the monitoring of the conditions in which the anti-squat shifting of the transmission is effected should be more suitably carried out, in the 4-wheel drive vehicles.

The engine speed as one of the conditions to effect the anti-squat shifting control of the transmission may be replaced by the currently required output of the engine, which is, for example, a currently detected amount of operation of the accelerator pedal of the vehicle. If the accelerator pedal is monitored upon shifting of the shift lever from the neutral position, or for a very short time after the shifting of the lever, the determination as to whether the operation amount of the accelerator pedal exceeds a predetermined limit or not is unstable and unreliable, since the accelerator pedal may be further depressed after the monitoring time is over. In this situation, the anti-squat control of the automatic transmission may be not properly accomplished so as to minimize the shifting shock of the transmission and the squatting of the vehicle.

SUMMARY OF THE INVENTION

It is therefore a first object of the present invention to provide a method of controlling an automatic transmission for a motor vehicle, wherein the determination as to whether predetermined conditions for effecting an anti-squat shifting of the transmission are satisfied or not continues even after the transmission shift lever has been shifted from the neutral position to one of the forward and reverse drive positions, so that the anti-squat shifting control of the automatic transmission may be achieved in a more stable and reliable manner.

A second object of the invention is to provide an apparatus suitable for practicing the method indicated above.

The first object may be attained according to one aspect of the present invention, which provides a method of controlling an automatic transmission for a motor vehicle, wherein the transmission has a plurality of gear positions which are selectively established, and is shifted to and temporarily held in a predetermined one of the gear positions other than the lowest-gear position, upon an operation of an operator-controlled shifting member from a neutral position to one of drive positions, to effect an anti-squat shifting of the transmission in response to the operation of the shifting member, so as to reduce a shifting shock of the transmission and avoid a squatting of the vehicle, comprising the steps of: detecting an operation of the shifting member from the neutral position to one of the drive positions; determining whether at least one condition for effecting the anti-squat shifting has been satisfied within a predetermined first time period after the operation of the shifting member, or not; and if the at least one condition is determined to have been satisfied within the first time period, commanding the transmission to be shifted to the above-indicated predetermined one gear position.

As indicated above, the anti-squat shifting of the transmission to its predetermined gear position for reducing the shifting shock takes place when the predetermined condition or conditions is/are satisfied within the predetermined time period after the operation of the operator-controlled shifting member from its neutral position to one of the drive positions such as DRIVE, SECOND, LOW and REVERSE as usually provided on ordinary automatic transmissions. The principle of the invention lies in that the determination relating to the predetermined condition or conditions for effecting the anti-squat shifting to the predetermined one gear position is not effected only at the time of operation of the shifting member, but is continued for the predetermined time period. According to this principle, even if the predetermined condition or conditions is/are not satisfied at the very moment of the operation of the shifting member, the transmission is shifted to the predetermined one gear position other than the lowest-gear position(usually, the 1st-gear or 1st-speed position), if the condition or conditions is/are satisfied a certain time after the operation of the shifting member, provided that the certain time is within the predetermined time period. Thus, the time is within the predetermined time period. Thus, the present invention permits improved stability and reliability of the anti-squat shifting control of the automatic transmission, so that the transmission is controlled with reduced shifting shock while permitting a smooth and rapid starting of the vehicle, depending upon the specific situation of the vehicle when and after the shifting member is moved from the neutral position to one of the forward and reverse drive positions.

For example, the following three conditions may be used to determine whether the anti-squat shifting of the transmission should be effected, or not: a first condition that a running speed of the vehicle is equal to or lower than a predetermined reference value; a second condition that an angle of opening of a throttle valve of the vehicle is equal to or larger than a predetermined reference value; and a third condition that the shifting member is not placed in the neutral position. All of these three conditions should be satisfied within the predetermined first time period, so that the transmission is shifted to the predetermined one anti-squat gear position.

The transmission may be held in the predetermined one gear position for a predetermined second time period following the predetermined first time period. In this case, the transmission is usually shifted down from the predetermined anti-squat gear position to the lowest-gear position upon expiration of the second time period.

According to another form of the invention, the method further comprises a step of determining, for a predetermined second time period following the predetermined first time period, whether the condition or conditions for the anti-squat shifting is/are satisfied, or not, and a step of shifting the transmission to the lowest-gear position when the predetermined one condition or any one of the conditions is dissatisfied.

The second object may be achieved according to another aspect of the invention, which provides an apparatus for controlling an automatic transmission for a motor vehicle, having a plurality of frictional coupling devices selectively operated for establishing a plurality of gear positions, and wherein the transmission is shifted to and temporarily held in a predetermined one of the gear positions other than the lowest-gear position, upon an operation of an operator-controlled shifting member from a neutral position to one of drive positions, to effect an anti-squat shifting of the transmission in response to the operation of the shifting member, so as to reduce a shifting shock of the transmission and avoid a squatting of the vehicle, comprising: detecting means for detecting an operation of the shifting member from the neutral position to one of the drive positions; time measuring means for measuring a lapse of time after the detection of the operation of the shifting member; determining means for determining whether at least one condition for effecting the anti-squat shifting has been satisfied within a predetermined first time period after the operation of the shifting member, or not; and commanding means for selectively operating the plurality of frictional coupling devices, for shifting the transmission to the predetermined one gear position, if the at least one condition is determined to have been satisfied within the first time period.

The apparatus may further comprise a shift position sensor operable as the above-indicated detecting means, for detecting a currently selected position of the shifting member, a vehicle speed sensor for detecting a running speed of the vehicle, and a throttle sensor for detecting an angle of operation of a throttle valve of the vehicle. In this instance, the above-indicated at least one condition for the anti-squat shifting may consist of a first condition that the running speed of the vehicle detected by the vehicle speed sensor is equal to or lower than a predetermined first reference speed, a second condition that the angle of opening of the throttle valve detected by the throttle sensor is equal to or larger than a predetermined first reference angle, and a third condition that the currently selected position of the shifting member detected by the shift position sensor is not the neutral position. Namely, the determining means is adapted to determine whether all of the first, second and third conditions have been satisfied within the first time period.

In a preferred form of the above arrangement of the invention, the apparatus further comprises means for determining, for a predetermined second time period following the predetermined first time period, whether each of a modified first condition and a modified second conditions corresponding to the first and second conditions, and the third condition is satisfied or not, and means for shifting the transmission from the predetermined one gear position to the lowest-gear position when any one of the modified first and second conditions and the third conditions becomes dissatisfied during the second time period. The first modified condition requires the detected running speed of the vehicle to be equal to or lower than a predetermined reference speed which is higher than the first reference speed. The second modified condition requires the detected angle of opening of the throttle valve to be equal to or larger than a predetermined second reference angle which is smaller than the first reference angle.

BRIEF DESCRIPTION OF THE DRAWINGS advantages of the present invention will be better understood by reading the following description of a presently preferred embodiment of the invention, when considered in connection with the accompanying drawings, in which:

FIG. 3 is a view showing operating states of solenoid-operated valves and frictional coupling devices of the automatic transmission, in different operating positions of the transmission;

DESCRIPTION OF THE PREFERRED EMBODIMENT

Figure 1:
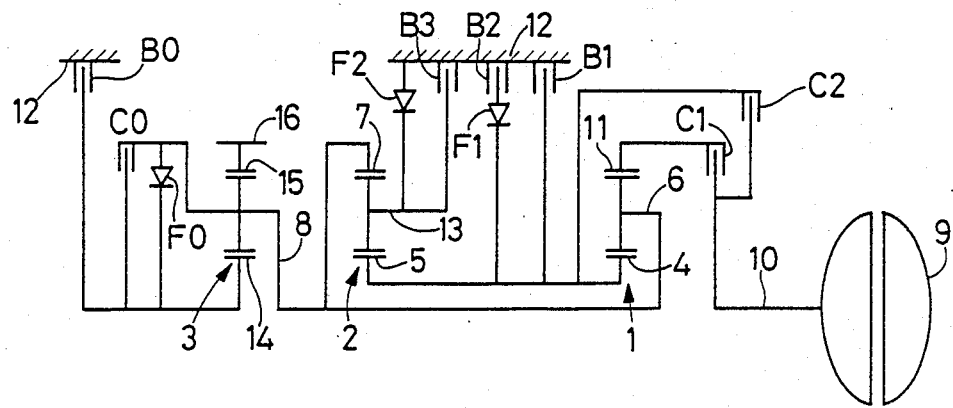
FIG. 1 is a schematic diagram of an example of an automatic transmission for a motor vehicle, to which the present invention is applicable.

Referring first to FIG. 1, there is schematically shown a general arrangement of an automatic transmission for an automotive vehicle, which is controlled according to one embodiment of the present invention which will be described.

The automatic transmission includes three planetary gear units, namely, a front planetary gear mechanism 1, a rear planetary gear mechanism 2, and an overdrive planetary gear mechanism 3.

The front and rear planetary gear mechanisms 1, 2 have respective sun gears 4, 5 which are connected to each other. The front planetary gear mechanism 1 further includes a carrier 6 which is connected to a ring gear 7 of the rear planetary gear mechanism 2. These carrier 6 and ring gear 7 are connected to a carrier 8 of the overdrive planetary gear mechanism 3.

The automatic transmission is coupled to a torque converter 9, which is connected to an engine of the vehicle. More specifically, the automatic transmission incorporates: a clutch C1 disposed between a turbine shaft 10 connected to the torque converter 9, and a ring gear of the front planetary gear mechanism 1; a clutch C2 disposed between the turbine shaft 10 and the sun gear 4 of the front planetary gear mechanism 1; a brake B1 disposed between a transmission case 12, and an assembly of the mutually connected sun gears 4 and 5; a one-way clutch F1 and a brake B2 which are disposed in serial connection with each other, between the sun gear assembly 4, 5 and the transmission case 12, such that the clutch F1 and brake B2 are in parallel with the brake B1; and a brake B3 and a one-way clutch F2 which are disposed in parallel with each other, between the transmission case 12 and a carrier 13 of the rear planetary gear mechanism 3.

The overdrive planetary gear mechanism 3 has a gear ratio smaller than "1", so that it provides a highest-gear position of the transmission for the most economical running of the vehicle. The overdrive planetary gear mechanism 3 has the carrier 8, a sun gear 14, a clutch C0 and a one-way clutch F0 which are disposed in parallel with each other between the carrier 8 and sun gear 14, and a brake B0 disposed between the sun gear 14 and transmission case 12.

This automatic transmission provides an output through a counter gear 16 connected to a ring gear 15 of the overdrive planetary gear mechanism 3.

Figure 2:
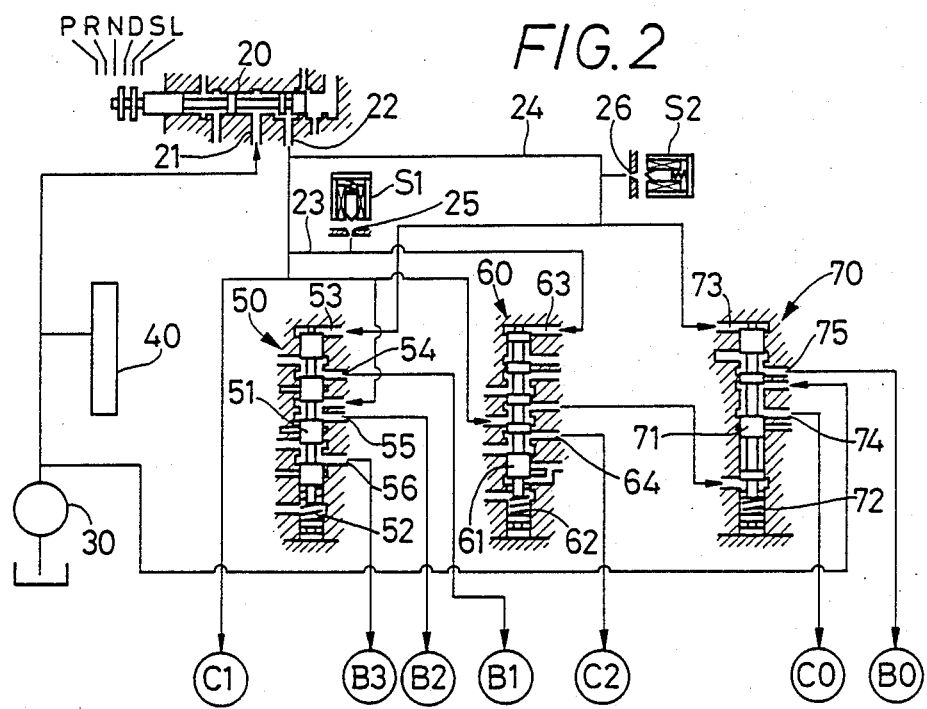
FIG. 2 is a fragmentary view of a hydraulic control circuit incorporated in a hydraulic control device for controlling transmission.

The clutches C0, C1 and C2 and the brakes B0, B1, B2 and B3 of the automatic transmission are selectively activated to selectively establish operating positions of the transmission, under the control of a hydraulic control device 18 (FIG. 4) which includes a hydraulic circuit as indicated in FIG. 2.

The hydraulic circuit incorporates a shift lever valve 20 operatively connected to a shift lever 90 (FIG. 4) of the vehicle. The shift lever 90, which is operated by an operator of the vehicle, has six operating positions P (PARKING), R (REVERSE), N (NEUTRAL), D (DRIVE), S (SECOND) and L (LOW). The shift lever valve 20 has the corresponding operating positions, P, R, N, D, S and L, as indicated in FIG. 2.

The shift lever valve 20 has an input port 21 which receives a line pressure of the hydraulic system, which is obtained such that a hydraulic pressure produced by a hydraulic pump 30 is adjusted by a primary regulator valve 40, in a known manner.

When the shift lever 90 is placed in the DRIVE position D, the transmission is selectively placed in one of four positions, i.e., 1st-speed, 2nd-speed, 3rd-speed and overdrive (OD) positions. With the shift lever 90 placed in the SECOND position (S), the transmission is selectively placed in one of the 1st-speed, 2nd-speed and 3rd-speed positions. In the LOW position (L), the transmission is placed in the 1st-speed or 2nd-speed position.

Reference numeral 50 in FIG. 2 denotes a 1-2 shift valve for shifting the automatic transmission between the 1st-speed and 2nd-speed positions. Reference numeral 60 denotes a 2-3 shift valve for shifting the transmission between the 2nd-speed and 3rd-speed positions. Reference numeral 70 denotes a 3-4 shift valve for shifting the transmission between the 3rd-speed and overdrive positions. The shift valves 50, 60 and 70 have respective spools 51, 61, 71 which are biased by respective springs 52, 62, 72, in the upward direction as seen in FIG. 2. With the line pressure applied to pilot ports 53, 63, 73 of the valves 50, 60, 70, the corresponding spools 51, 61, 71 are moved in the downward direction, against the biasing forces of the springs 52, 62, 72. The movements of the spools 51, 61, 71 cause the valves 50, 60, 70 to attain predetermined functions for controlling the automatic transmission, in response to an operation of the shift lever 90, as described below.

The pilot ports 53, 63, 73 indicated above are connected to an output port 22 of the shift lever valve 20. The output port 22 is brought into communication with the input port 21 when the shift lever 90 and the shift lever valve 20 are placed in the DRIVE (D), SECOND (S) or LOW (L) position. More specifically, the output port 22 is connected to the pilot port 63 of the 2-3 shift valve 60 through a conduit 23 to which a solenoid-operated valve S1 is connected. Further, the output port 22 is connected to the pilot ports 53 and 73 of the 1-2 shift valve 50 and 3-4 shift valve 70, through a conduit 24 to which another solenoid-operated valve S2 is connected.

The solenoid-operated valves S1 and S2 are provided with respective ports 25, 26. These ports 25, 26 are closed when the solenoid coils of the valves S1, S2 are deenergized or held OFF, so that the line pressure in the conduits 23, 24 is maintained. When the coils of the valves S1, S2 are energized or turned ON, the ports 25, 26 are opened, whereby the pressure in the conduits 23, 24 is released into a drain of the hydraulic system.

The solenoid-operated valves S1 and S2 of the hydraulic control device 18 are controlled by a transmission control computer 80 (FIG. 4), as described below.

The clutch C1 is connected to the output port 22 of the shift lever valve 20, while the clutch C2 is connected to a port 64 of the 2-3 shift valve 60. The port 64 is supplied with the line pressure when the valve spool 61 is moved against the biasing action of the spring 62. The clutch C0 is connected to a port 74 of the 3-4 shift valve 70. The port 74 is supplied with the line pressure when the valve spool 71 is held in its upper position (in FIG. 2) by the spring 72. The brakes B1, B2 and B3 are connected to ports 54, 55 and 56, respectively of the 1-2 shift valve 50, while the brake B0 is connected to a port 75 of the 3-4 shift valve 70.

With the hydraulic control device 18 thus constructed, the 1st-speed position, 2nd-speed position, 3rd-speed position and overdrive position (OD) are selectively established, with the solenoid-operated valves S1, S2, clutches C0–C2 and brakes B0–B3 being placed in the appropriate operating states as indicated in FIG. 3, depending upon the currently selected position of the shift 5 lever valve 20. In FIG. 3, the ON or engaged state of the valves, clutches and brakes are represented by "o", while the OFF or disengaged state is represented by "x".

Figure 4:
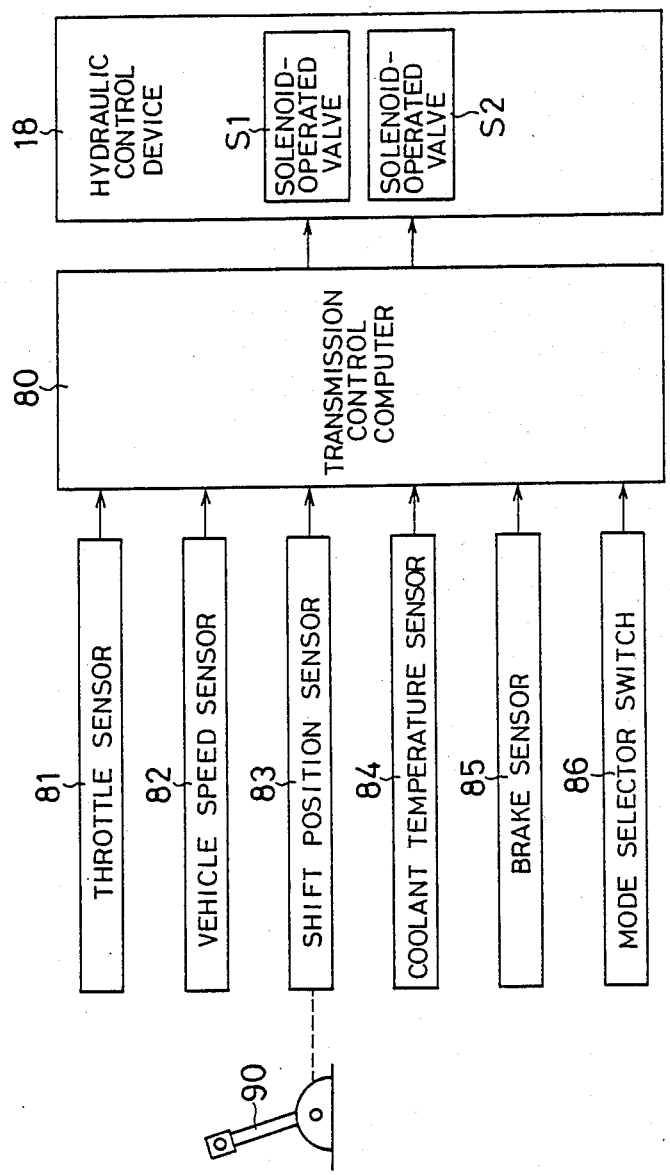
FIG. 4 is a block diagram of an electric control system including a transmission control computer, for controlling the automatic transmission through the hydraulic control device, according to input signals from various sensors.

Referring to FIG. 4, the transmission control computer 80 which controls the hydraulic control device 18 is adapted to receive various input signals from respective sensors which include: a throttle sensor 81 for detecting an opening angle $\theta$ of a throttle valve of the engine, which represents a currently required output or torque of the engine; a vehicle speed sensor 82 for detecting a running speed V of the vehicle; a shift position sensor 83 for detecting the currently established position (P,R,N,D,S or L) of the shift lever 90 (shift lever valve 20); a coolant temperature sensor 84 for detecting a temperature of a cooling water of the engine; a brake sensor 85 for detecting an operation or depression of a brake pedal of the vehicle; and a mode selector switch 86 for determining or sensing one of two running modes of the vehicle which is selected by the vehicle operator, i.e., either POWER mode in which the vehicle is driven with a comparatively high degree of drivability, or ECONOMY mode in which the vehicle is driven with comparatively reduced fuel consumption.

In response to the signals from the above sensors, the transmission control computer 80 controls the solenoid-operated valves S1 and S2, according to a predetermined shifting map or relationship between the throttle opening angle and the vehicle speed, in a well known manner, so that the automatic transmission is shifted from one of the four positions (1st, 2nd, 3rd, OD) to another, in dependence of the currently selected one of the three forward drive positions (D, S, L) of the shift lever 90 or shift lever valve 20.

If the anti-squat control of the automatic transmission is not effected upon operation of the shift lever 90 from its NEUTRAL position (N) to its DRIVE (D) position, for example, only the clutch C1 is supplied with the line pressure in order to shift the transmission to the 1st-speed position. However, if particular conditions are satisfied, the anti-squat control of the transmission is effected when the shift lever 90 is moved from its NEUTRAL position to its DRIVE position. Namely, the transmission is first shifted to one of the 2nd-speed position or higher gear position, and then shifted to the 1st-speed position. For example, the clutch C1 and the brake B2 are engaged to once establish the 2nd-speed position, and then the brake B2 is disengaged to shift the transmission to the 1st-speed position.

In the present embodiment, the particular conditions that should be satisfied to effect the anti-squat control of the automatic transmission consist of: (1) The vehicle speed V should be equal to or lower than a predetermined value; (2) The throttle opening angle $\theta$ should be equal to or larger than a predetermined value; and (3) The shift lever 90 should be placed in a position other than the NEUTRAL position (N). All of these three conditions should be satisfied within a predetermined time period To.

The rationale for these three conditions for the anti-squat control of the automatic transmission will be described below.

The first condition associated with the running speed of the vehicle is provided since a drive torque variation which occurs upon shifting of the transmission from the neutral position to the 1st-speed position does not cause a considerable shifting shock if the vehicle speed at the time of the operation of the shift lever 90 from the NEUTRAL position to the DRIVE position is relatively high, or if the vehicle speed rises above a predetermined upper limit within the predetermined time period To after the commencement of movement of the shift lever. In these cases, therefore, the anti-squat control of the transmission is not necessary, and the transmission should be shifted rapidly to the 1st-speed position.

The second condition associated with the currently required engine load or output (i.e., throttle valve position) is provided since the shifting shock upon shifting of the transmission from the neutral position to the 1st-speed position is not considerable when the shifting occurs while the required engine output (represented by the throttle opening angle) is relatively small. In this case, the shifting shock may be greater when the transmission is shifted from the 2nd-speed or higher gear position back to the 1st-speed position, than when the transmission is shifted directly to the 1st-speed position.

Thus, no appreciable advantage is offered by effecting the anti-squat controlling of the transmission, in the above-indicated cases. Therefore, the transmission is shifted from the neutral position directly to the 1st-speed position, so as to permit a quick starting of the vehicle, when the shift lever 90 is moved from the NEUTRAL position to the DRIVE position where at least one of the above-indicated two conditions is not satisfied.

The third condition associated with the position of the shift lever 90 (shift lever valve 20) is provided in view of a relatively high possibility of an erroneous operation of the shift lever 90 by the vehicle driver. For example, the shift lever is moved from the NEUTRAL position to the DRIVE or REVERSE position, and then back to the NEUTRAL position, within a relatively short time duration. In these cases, the execution of the anti-squat shifting of the transmission is meaningless, even though the above first and second conditions are satisfied, because the return of the shift lever 90 to the NEUTRAL position reflects the absence of the driver's intention to place the shift lever in the DRIVE position. The determination on this third condition, namely, the determination as to whether the shift lever 90 is placed in the NEUTRAL position is also carried out at the end of the predetermined time period To after the movement of the shift lever 90 from the NEUTRAL position. Consequently, a negative decision may be obtained on this third condition, in the above-indicated cases wherein the shift lever 90 which was once moved from the NEUTRAL position is returned to the NEUTRAL position within the time period To.

In the present embodiment, therefore, the automatic transmission undergoes the anti-squat shifting only if all the three conditions discussed above have been satisfied within the above-indicated first time period To and if these conditions exist upon expiration of the time period To. In this instance, the automatic transmission is shifted in the anti-squat shifting mode, i.e., once shifted to the 2nd-speed or higher gear position, held in that position for a predetermined second time period T1, and then shifted to the 1st-speed position, for minimizing the shifting shock which would otherwise be considerable upon operation of the shift lever 90 from its NEUTRAL position to the DRIVE position.

If at least one of the three conditions has been dissatisfied during the first and second time periods To, T1, the transmission is shifted directly to the 1st-speed position, or returned from the 2nd-speed or higher gear position back to the 1st-speed position, because the anti-squat shifting is or becomes meaningless or unuseful, and rather the 1st-speed position should preferably be established at once for assuring smooth and rapid starting of the vehicle. It will be understood from the foregoing description that the instant embodiment is adapted to interrupt the anti-squat shifting as soon as any one of the three conditions has been dissatisfied after the conditions were once satisfied.

While the above description refers to the anti-squat shifting control when the shift lever 90 is moved from the NEUTRAL position to the DRIVE position, it is to be understood that the anti-squat shifting control is equally applicable to the operation of the shift lever 90 from the NEUTRAL position to the other forward drive position (SECOND or LOW position) or to the REVERSE position, for the reasons which will be described.

Figure 5:
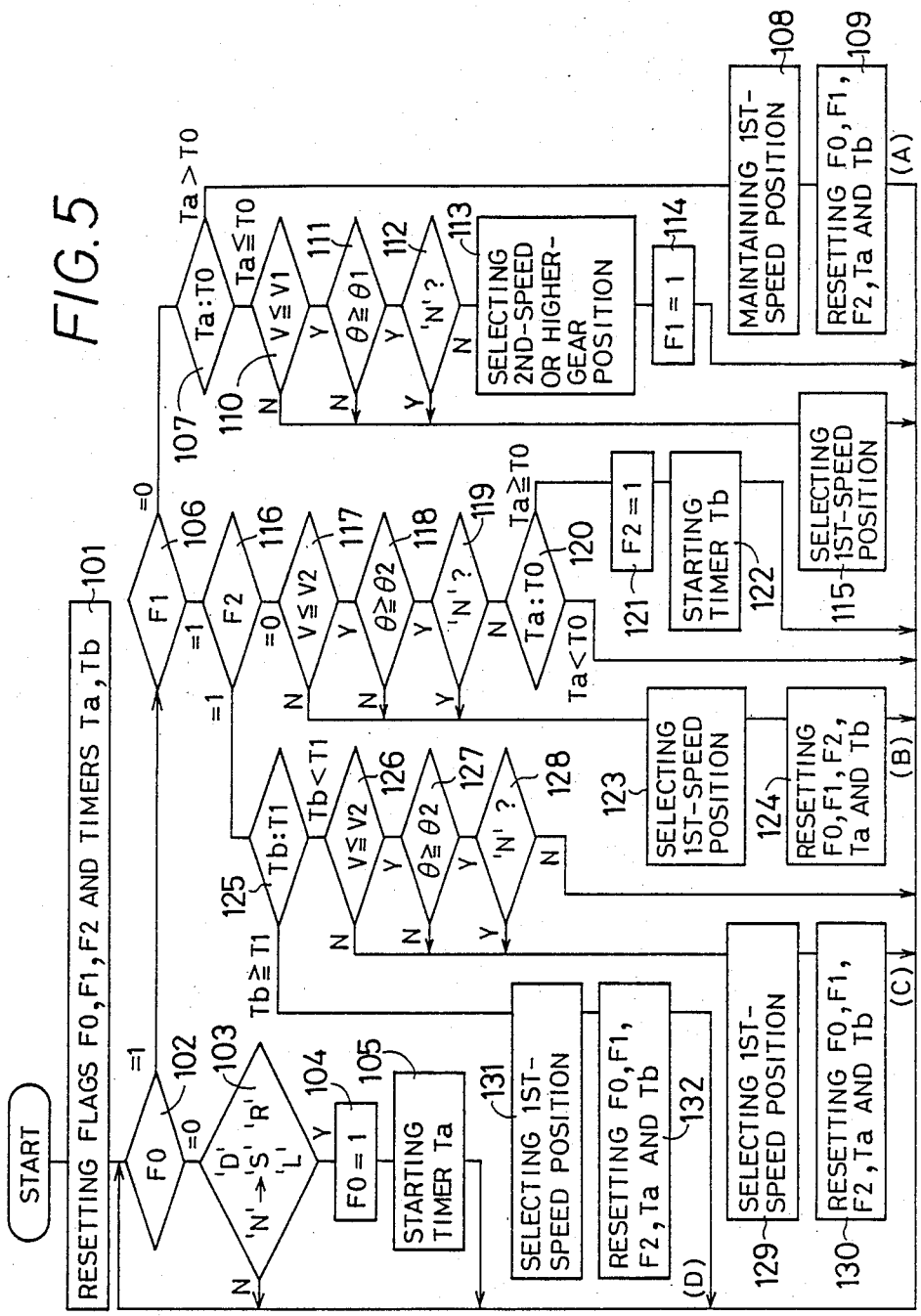
FIG. 5 is a flow chart illustrating a control routine for controlling the automatic transmission according to one of embodiment of the invention.

Reference is now made to the flow chart of FIG. 5, which illustrates process steps for effecting the anti-squat shifting control routine for the automatic transmission, under the control of the transmission control computer 80.

Initially, the control flow goes to initializing step 101 wherein flags F0, F1, F2 and timers Ta and Tb are reset.

Step 101 is followed by step 102 to determine whether the content of the flag F0 is "1" or "0". This flag F0 is set to "1" when the shift lever 90 has been moved from the NEUTRAL position to any one of the forward or reverse drive positions, DRIVE (D), SECOND (S), LOW (S) and REVERSE (R). The flag F0 remains "0" until the above movement of the shift lever 90 has occurred. Since the flag F0 is reset to "0" in step 101, a negative decision (F0=0) is obtained in step 102 in the first control cycle, and the control flow goes to step 103.

In step 103, the transmission control computer 80 determines whether the shift lever 90 (shift lever valve 20) has been moved from the NEUTRAL position to one of the forward and reverse drive positions D, S, L, R. If an affirmative decision (Y) is obtained in step 103, step 104 is executed to set the flag F0 to "1", and step 105 is executed to start a timer Ta for measuring the predetermined first time period To after the detection of movement of the shift lever 90 from the NEUTRAL position to one of the drive positions D, S, L, R.

If a negative decision (N) is obtained in step 103, i.e., if the shift lever 90 is not moved from the NEUTRAL position to one of the drive positions D, S, L, R, the control flow returns to step 102.

Once the flag F0 is set to "1", step 102 is followed by step 106 to determine whether the content of a flag F1 is "1" or "0". This flag F1 is set to "1" when the anti-squat shifting of the automatic transmission has been accomplished. Since this flag F1 is also reset to "0" in step 101, a negative decision (N) is obtained in step 106 in the first execution of this step 106. Consequently, the control flow goes to step 107.

Step 107 and the subsequent steps are implemented to determine whether the above-indicated three conditions for effecting the anti-squat shifting of the transmission have been satisfied or not. In step 107, the control computer 80 determines whether the content of the timer Ta is equal to the predetermined first time period To, or not. If the transmission remains in the 1st-speed position for a time longer than the time period To after the operation of the shift lever 90 from the NEUTRAL position to one of the forward and reverse drive positions, the transmission is commanded in step 108 to be continuously maintained in the 1st-speed position. Then, step 109 is executed to reset the flags F0, F1, F2 and the timers Ta, Tb. The control flow then returns to step 102.

Figure 6A:
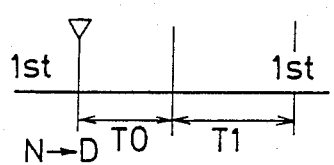
FIGS. 6(A) through 6(G) are illustrations showing different situations in which an anti-squat control operation of the automatic transmission is effected in the embodiment of FIG. 5.

As a result, the transmission is held in the 1st-speed position even after the expiration of the first time period To from the moment of detection of the operation of the shift lever 90 from the NEUTRAL position to one of the drive positions, as indicated in FIG. 6(A). Namely, the anti-squat shifting of the transmission is not effected in this case.

Before the first time period To has not passed after the operation of the shift lever 90 from the NEUTRAL position, step 107 is followed by step 110 in which the control computer 80 determines whether the vehicle speed V is equal to or lower than a predetermined level V1, or not. This speed level V1 is almost or near zero. That is, step 110 is provided to check if the vehicle is almost stopped or stationary. If the vehicle speed V is equal to or lower than the predetermined level V1, or if the vehicle is almost stopped, step 110 is followed by step 111 to determine whether the opening angle $\theta$ of the throttle valve is equal to or larger than a predetermined value $\theta$1, or not. If an affirmative decision (Y) is obtained in step 111, the control flow goes to step 112 to determine whether the shift lever 90 is placed in the NEUTRAL position, or not. If the shift lever 90 is not in the NEUTRAL position, all the three conditions for effecting the anti-squat shifting of the transmission have been satisfied (in steps 110, 111 and 112), the control computer 80 produces in step 113 a command to shift the transmission to the 2nd-speed position or higher gear position (3rd-speed or overdrive position), whereby the anti-squat shifting of the transmission is achieved. Subsequently, the flag 1 is set to "1" in step 114, for indicating that the three conditions have been satisfied. In the present embodiment, steps 107, 110, 111 and 112 correspond to means for determining whether the three conditions for the anti-squat shifting of the automatic transmission, and step 113 and subsequent steps including step 120 correspond to means for temporarily placing the transmission in the 2nd-speed or higher gear position.

If any one of the three conditions of steps 110-112 has not been satisfied, the control flow goes to step 115 in which a command is generated to shift the transmission to the 1st-speed position.

Once the flat F1 has been set to "1", step 106 is followed by step 116 to determine whether the content of the flag F2 is "1" or "0". The flag F2 is set to "1" when all of the three conditions for the anti-squat shifting are satisfied upon expiration of the first time period To. If any one of the three conditions is not satisfied at that moment, the flat F2 is reset to "0".

Since the flag F2 is reset to "0" in step 101, step 116 is followed by step 117 when the step 116 is initially executed. Steps 117, 118 and 119, which correspond to step 110, 111 and 112, respectively, are provided to again determine whether the three conditions have been satisfied. However, steps 117 and 118 use reference values V2 and $\eta$2 which may or may not be different from the values V1 and $\theta$1 used in steps 110 and 111. That is, the value V2 is equal to or larger than the value V1, and the value $\theta$2 is equal to or smaller than the value $\theta$1. The difference between the values V1 and V2, and the difference between the values $\theta$1 and $\theta$2, are desirable to provide a hysteresis between the conditions for effecting the anti-squat shifting of the transmission, and the conditions for releasing or terminating the anti-squat shifting, so as to avoid a hunting of the control system which might arise where the reference values in steps 117 and 118 are equal to those in steps 110 and 111.

When steps 117, 118 and 119 confirm that all the three conditions are still satisfied, the control flow goes t step 120 to determine whether the predetermined first time period To has passed. If the time period to has not yet passed, the control flow returns to step 102. If the time period To has passed, step 120 is followed by step 121 in which the flag F2 is set to "1". Then, the control flow goes to step 122 in which the timer Tb is started to measure the predetermined second time period T1, which follows the first time period To and in which the transmission is held in the predetermined 2nd-speed or higher gear position, provided that the three conditions for the anti-squat shifting control of the transmission are satisfied after the first time period To.

Figure 6B:
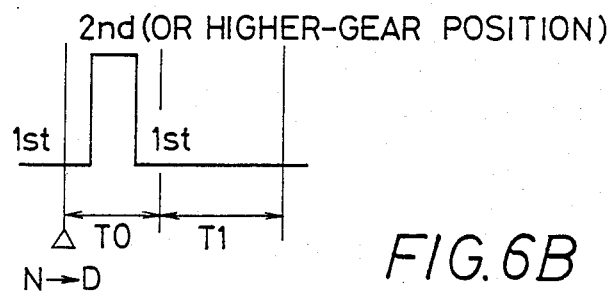

In any one of the three conditions of steps 117, 118, 119 is not satisfied, the corresponding step is followed by step 123 in which the transmission is shifted to the 1st-speed position. Then, step 124 is executed to reset the flags F0, F1, F2 and timers Ta, Tb, and the control routine of FIG. 5 is terminated. In this case, the transmission is first shifted to the 2nd-speed (or higher gear position) when all the three conditions have been once satisfied (steps 110, 111, 112), and is then shifted to the 1st-speed position if any one of the three conditions becomes unsatisfied before the first time period To has passed. The present situation is illustrated in FIG. 6(B).

In the case where the flag F2 is set to "1" in step 121, step 116 is followed by step 125.

In step 125, the control computer 80 determines whether the content of the timer Tb becomes equal to the predetermined second time period T1, or not. Until the content of the timer Tb becomes equal to "T1", step 125 is followed by step 126. In step 126 and subsequent steps 127, 128, the control computer 80 again determines whether the three conditions are satisfied, or not. The conditions in these steps 126-128 are the same as those in steps 110-112.

Figure 6C:
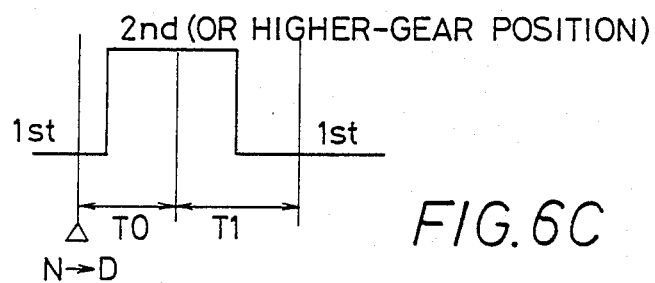

If steps 126-128 confirm that all the three conditions are satisfied, the currently established state of the control system is maintained. Namely, the transmission remains in the 2nd-speed or higher gear position. If any one of the three conditions becomes dissatisfied in steps 126-128, the transmission is shifted to the 1st-speed position in step 129, and the flags F0, F1, F2 and timers Ta, Tb are reset in step 130 before the control returns to step 102. Thus, as indicated in FIG. 6(C), the transmission placed in the 2nd-speed position (or higher gear position) upon expiration of first time period To is shifted down to the 1st-speed position if any one of the three conditions has become unsatisfied during the lapse of the second time period T1, i.e., before the time period T1 has passed. This situation is illustrated in FIG. 6(C).

Figure 6D:
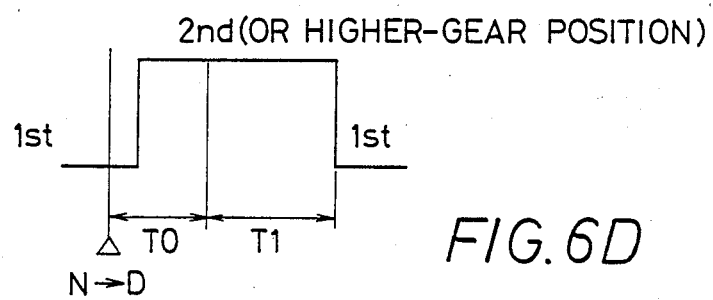

If step 125 reveals that the content of the timer Tb has become equal to the second time period T1, the control flow goes to step 131 in which the transmission is shifted to the 1st-speed position, and step 132 to reset the flags and timers F0, F1, F2, Ta, Tb. This situation is illustrated in FIG. 6(D), in which the transmission is shifted to the 2nd-speed or higher gear position with the three conditions satisfied prior to the passage of the first time period To after the operation of the shift lever 90 from the NEUTRAL position to one of the forward and reverse drive positions D, S, L, R (steps 107, 110, 111, 112, 113), and the transmission is held in the same position until the sum of the first and second time periods To, T1 has passed (116-122, 125-128, 131), for which the three conditions remain satisfied. In this case, the transmission is held in the 2nd-speed or higher gear position for the longest time.

It will be understood that the adjustment of the first time period To provides improved versatility in determining as to whether the anti-squat shifting of the transmission is effected or not. The time period To is determined, for example, by the nominal output of the specific engine, and/or depending upon whether the vehicle has a 2-wheel or 4-wheel drive system. If the time period To is zero, the anti-squat shifting control of the transmission may be completely disabled.

According to the anti-squat shifting control of the transmission as described above, the transmission is shifted down from the 2nd-speed or higher gear position to the 1st-speed position as soon as the vehicle speed rises above the predetermined level V1 or V2 as a result of a rapid increase in the throttle opening at the time of starting of the vehicle. Further, the time during which the transmission is held in the 2nd-speed or higher gear position does not exceed the sum of the first and second time periods To and T1. Thus, the present arrangement may reduce the shifting shock of the vehicle, while permitting a rapid and smooth starting of the vehicle.

Figure 6E:
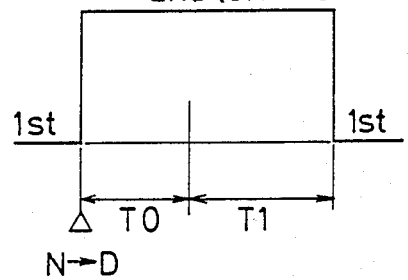
Figure 6F:
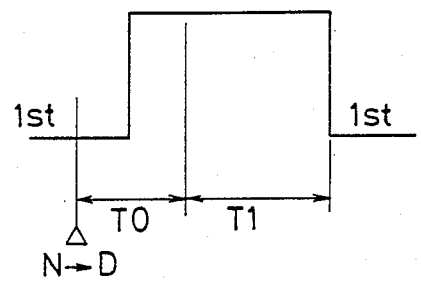
Figure 6G:
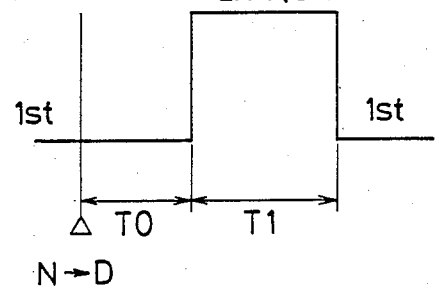

FIGS. 6(E), 6(F) and 6(G) illustrate three cases in which the three conditions have been satisfied at different times and remain satisfied until the second time period T1 has lapsed. It will be seen from these figures that the duration during which the transmission is held in the 2nd-speed or higher gear position (3rd-speed or overdrive position) increases depending upon the time at which the three conditions have been satisfied. Namely, the duration is the longest (To +T1) when the conditions have been satisfied at the earliest time (i.e., at the beginning of the first time period To), and the shortest (T1) when the conditions have been satisfied at the latest time (i.e., immediately before the expiration of the time period To). Generally, hydraulically operated frictional coupling devices of an automatic transmission cannot be engaged at the time when the shift lever 90 (shift lever valve 20) has been operated from the NEUTRAL position to a drive position. Consequently, the engine is held in a non-loaded condition for a certain time after the operation of the shift lever. This means that the earlier the time of satisfaction of the three conditions the longer the time of duration for which the accelerator pedal is kept depressed with the engine in the non-loaded condition. The present arrangement wherein the duration of the transmission held in the 2nd-position or higher gear position is increased with the timing of satisfaction of the three conditions, is based on the above fact, and is suitable for accomplishing the anti-squat shifting control of the transmission, in an optimum manner for preventing the shifting shock while permitting the smooth starting of the vehicle.

While the vehicle is usually started with the shift lever 90 moved from the NEUTRAL position to the DRIVE position, the shift lever may be shifted to the SECOND (S), LOW (L) or REVERSE (R) position to start the vehicle. In these cases, too, the principle of the present invention is practiced. It is noted that step 103 determines whether the shift lever 90 is moved from the NEUTRAL position to any one of the forward and reverse drive positions D, S, L and R. When the anti-squat shifting of the transmission is effected in the case of the shift lever movement from the NEUTRAL position to the REVERSE position, the transmission is first shifted to a high gear reverse position), with the brake B0 being engaged and clutch C0 being released.

The position to which the transmission is shifted prior to the shifting to the 1st-speed position, for an anti-squat shifting according to the present invention, is selected depending upon the specifications of the vehicle such as the nominal engine output rating and the drive system (2-wheel drive or 4-wheel drive). If a considerably large shifting shock of the transmission is expected upon shifting of the shift lever from the neutral position to a drive position, the transmission is shifted to an accordingly higher gear position (e.g., 3rd-speed position or overdrive position), for providing an effective anti-squat shifting of the transmission.

What is claimed is:

1. A method of controlling an automatic transmission for a motor vehicle with an engine, wherein the transmission has a plurality of selectively established gear positions including a lowest-gear position, and is shifted and temporarily held in a predetermined one of the gear positions other than the lowest-gear position, upon an operation of an operator-controlled shifting member from a neutral position to one of drive positions, to effect an anti-square shifting of the transmission in response to the operation of the shifting member, so as to reduce a shifting shock of the transmission and avoid a squatting of the vehicle, comprising the steps of:
   detecting an operation of said shifting member from said neutral position to one of said drive positions;
   determining whether at least one condition for effecting said anti-squat shifting has been satisfied within a predetermined first time period after said operation of said shifting member or not, said at least one condition including an engine output condition that a currently required output of said engine is equal to or larger than a predetermined reference value which is higher than a value corresponding to an idling condition of said engine; and
   if all of said at least one conditions are determined to have been satisfied within said first time period, commanding said transmission to be shifted to said predetermined one gear position.

2. A method according to claim 1, wherein said at least one condition consists of a first condition that a running speed of the vehicle is equal to or lower than a first predetermined reference value, a second condition that an angle of opening of a throttle valve of the vehicle is equal to or larger than a second predetermined reference value, and a third condition that said shifting member is not placed in said neutral position, said engine output condition consisting of said second condition.

3. A method according to claim 1, wherein said transmission is held in said predetermined one gear position for a predetermined second time period following said predetermined first time period if all of said at least one condition remain satisfied within said predetermined second time period, and further comprising a step of shifting down said transmission of said lowest-gear position upon expiration of said second time period.

4. A method according to claim 1, further comprising determining, for a predetermined second time period following said predetermined first time period, whether said at least one condition is satisfied or not, and shifting said transmission to said lowest-gear position when any one of said at least one condition becomes dissatisfied.

5. A method according to claim 1, further comprising a step of shifting down said transmission from said predetermined one gear position to said lowest-gear position when any one of said at least one conditions becomes dissatisfied within said predetermined first time period.

6. An apparatus for controlling an automatic transmission for a motor vehicle with an engine, having a plurality of frictional coupling devices selectively operated for establishing a plurality of gear positions including a lowest-gear position, and wherein said transmission is shifted to and temporarily held in a predetermined one of the gear positions other than the lowest-gear position, upon an operation of an operator-controlled shifting member from a neutral position to one of drive positions, to effect an anti-squat shifting of the transmission in response to the operation of the shifting member, so as to reduce a shifting shock of the transmission and avoid a squatting of the vehicle, comprising:
 detecting means for detecting an operation of said shifting member from said neutral position to one of said drive positions;
 time measuring means for measuring a lapse of time after the detection of said operation of said shifting member;
 an engine output sensor for detecting a currently required output of said engine;
 determining means for determining whether at least one condition for effecting said anti-squat shifting has been satisfied within a predetermined first time period after said operation of said shifting member, or not, said at least one condition including an engine output condition that said currently required output of the engine is equal to or larger than a predetermined reference value which is higher than a value corresponding to an idling condition of said engine, said determining means comprising means for determining whether said engine output condition has been satisfied within said first time period, or not; and
 commanding means for selectively operating said plurality of frictional coupling devices, for shifting said transmission to said predetermined one gear position, if all of said at least one conditions are determined to have been satisfied within said first time period.

7. An apparatus according to claim 6, further comprising a shift position sensor operable as said detecting means, for detecting a currently selected position of said shifting member, a vehicle speed sensor for detecting a running speed the vehicle, and a throttle sensor for detecting an angle of operation of a throttle valve of the vehicle, and wherein said at least one condition used for said first time period comprises of a first condition that the running speed of the vehicle is detected by said vehicle speed sensor is equal to or lower than a predetermined first reference speed, a second condition that the angle of opening of said throttle valve detected by said throttle sensor is equal to or larger than a predetermined first reference angle, and a third condition that the current selected position of said shifting member detected by said shift position sensor is not said neutral position, said engine output condition comprising said second condition, said determining means determining whether all of said first, second and third conditions have been satisfied within said first time period.

8. An apparatus according to claim 7, further comprising means for determining, for a predetermined second time period following said predetermined first time period, whether each of a modified first condition and a modified second condition corresponding to said first and second conditions, and said third condition is satisfied or not, and further comprising means for shifting said transmission from said predetermined one gear position to said lowest-gear position when any one of said modified first and second conditions and said third condition becomes dissatisfied during said second time period, said first modified condition requiring the detected running speed of the vehicle to be equal to or lower than a predetermined second reference speed which is higher than said first reference speed, said second modified condition requiring the detected angle of opening of said throttle valve to be equal to or larger than a predetermined second reference angle which is smaller than said first reference angle.

9. An apparatus according to claim 6, further comprising means for shifting down said transmission from said predetermined one gear position to said lowest-gear position upon expiration of a predetermined second time period following said predetermined first time period.

10. An apparatus according to claim 6, further comprising means for determining, for a predetermined second time period following said predetermined first time period, whether said at least one condition is satisfied or not, and means for shifting said transmission from said predetermined one gear position to said lowest-gear position when any one of said at least one condition becomes dissatisfied.

11. An apparatus according to claim 6, further comprising means for shifting down said transmission from said predetermined one gear position to said lowest-gear position when any one of said at least one condition becomes dissatisfied within said predetermined first time period.

* * * * *